United States Patent
Cowan

(10) Patent No.: US 10,576,895 B2
(45) Date of Patent: Mar. 3, 2020

(54) ARM ASSEMBLY FOR A SIDE VIEW MIRROR

(71) Applicant: Clearview Property Management Pty Ltd, Vic (AU)

(72) Inventor: Michael Cowan, Vic (AU)

(73) Assignee: CLEARVIEW PROPERTY MANAGEMENT PTY LTD, Craigieburn, Vic (AU)

( * ) Notice: Subject to any disclaimer, the term of this patent is extended or adjusted under 35 U.S.C. 154(b) by 0 days.

(21) Appl. No.: 16/033,376

(22) Filed: Jul. 12, 2018

(65) Prior Publication Data

US 2019/0016265 A1   Jan. 17, 2019

(30) Foreign Application Priority Data

Jul. 12, 2017 (AU) .................................. 2017902741

(51) Int. Cl.
*B60R 1/06* (2006.01)
*B60R 1/00* (2006.01)

(52) U.S. Cl.
CPC ............ *B60R 1/0617* (2013.01); *B60R 1/006* (2013.01)

(58) Field of Classification Search
CPC .............................. B60R 1/0617; B60R 1/006
See application file for complete search history.

(56) References Cited

U.S. PATENT DOCUMENTS

| | | | | |
|---|---|---|---|---|
| 5,137,247 A * | 8/1992 | Lang | ...................... | B60R 1/0617 248/549 |
| 5,364,058 A * | 11/1994 | Shepherd | .............. | B60R 1/0617 248/479 |
| 5,483,385 A * | 1/1996 | Boddy | ..................... | B60R 1/078 248/477 |
| 6,276,805 B1 * | 8/2001 | Home | ....................... | B60R 1/06 248/476 |
| 6,276,808 B1 * | 8/2001 | Foote | ...................... | B60R 1/078 248/472 |
| 6,439,730 B1 * | 8/2002 | Foote | .................... | B60R 1/0617 359/871 |
| 6,598,983 B1 * | 7/2003 | Boddy | .................... | B60R 1/076 248/477 |
| 7,314,285 B2 * | 1/2008 | Ruse | ..................... | B60R 1/0617 248/479 |
| 7,735,196 B2 * | 6/2010 | Centmayer | ........... | B60R 1/0617 16/330 |
| 2002/0021509 A1 | 2/2002 | Foote et al. | | |

FOREIGN PATENT DOCUMENTS

EP         1886873 A1     2/2008

* cited by examiner

*Primary Examiner* — Anita M King
(74) *Attorney, Agent, or Firm* — Muncy, Geissler, Olds & Lowe, P.C.

(57) ABSTRACT

Disclosed herein is an assembly for a side view mirror for a vehicle. The assembly comprises two arm members which are configured to receive a side view mirror thereat and a joining member for joining the arm members. The joining member comprises two sleeves, where each sleeve projects from a respective arm member and comprises an interlocking profile at a distal end thereof. The assembly also comprises a tightener configured for receipt through the sleeves when the sleeves are in an aligned configuration. Tightening the tightener draws the interlocking profiles of the aligned sleeves into engagement, whereby the arm members become rigidly joined.

15 Claims, 4 Drawing Sheets

ARM ASSEMBLY FOR A SIDE VIEW MIRROR

TECHNICAL FIELD

The present invention relates to an assembly comprising two arm members and a joining member for rigidly joining the arm members. In a particular form, the present invention relates to a rigid arm assembly for use in side view mirrors for vehicles.

BACKGROUND ART

Rigidly holding two or more elongate members in a desired alignment can often be mechanically challenging if the elongate members are not integrally formed. In some circumstances, however, installation requirements may necessitate that elongate members be separately provided, but subsequently joinable to provide the required functionality. For example, in many types of power folding side view mirrors for vehicles, two substantially parallel arm members are required in order to support the side view mirror in position at the side of the automobile. In order to assemble the power folding side mirrors, however, the arm members typically need to be provided as separate components which are joined via a perpendicularly orientated joining member that is passed through a channel within the mirror base (the mirror base usually having already been installed on the side of the vehicle). The power folding action of the mirror is then caused by an electric motor rotating the joining member (and hence the parallel arms, etc.) within the base.

In existing power folding side view mirrors, an arm assembly is provided including two arm members, where one of the arms includes a perpendicularly extending rod and the other a recess configured to receive the distal end of the rod. However, the inventors discovered that the arms of such an assembly, even when the rod has a reasonably snug fit within the other arm's recess, have some degree of play. This play (even if only slight) enables relative movement and twisting of one arm with respect to the other and hence movement of the side mirror. The inventors noticed that independent movement at the distal ends of the arms (i.e. those furthest away from the vehicle) caused the side view mirror to vibrate (especially when the assembly is on a vehicle driving over rough terrain), hence potentially reducing its usefulness as well as its lifespan.

The inventors further noted that such vibrations were exacerbated in the case of side view towing mirrors, which tend to be larger and extend further away from the vehicle's sides than conventional side view mirrors.

It would be advantageous to provide an assembly comprising two separate arm members and a joining member which can rigidly join the arm members.

SUMMARY OF INVENTION

In a first aspect, the present invention provides an assembly for a side view mirror for a vehicle. The assembly comprises two arm members which are configured to receive a side view mirror thereat and a joining member for joining the arm members. The joining member comprises two sleeves, where each sleeve projects from a respective arm member and comprises an interlocking profile at a distal end thereof. The assembly also comprises a tightener configured for receipt through the sleeves when the sleeves are in an aligned configuration. Tightening the tightener draws the interlocking profiles of the aligned sleeves into engagement, whereby the arm members become rigidly joined.

The interlocking profiles on the respective sleeves of the joining member securely lock the arms together, thereby providing what is effectively a one piece joining member. When so-joined, twisting of the arms with respect to each other is much less likely to occur and, in specific embodiments, is simply not possible. The assembly of the present invention can advantageously substantially eliminate relative movement of the joined arm members with respect to each other, which movement might otherwise affect the utility of the assembly (e.g. when used in a side view mirror, as described herein).

In some embodiments, each sleeve may be positioned proximal to an end of the respective arm member. Such a configuration would be compatible with the foldable (either power foldable or manually foldable) vehicle side mirrors described above (and in further detail below), but without the attendant disadvantages of that mirror assembly.

In some embodiments, each sleeve may be integrally formed with the respective arm member. As would be appreciated, fewer joins between the components of the assembly would even further reduce the likelihood of there being any play between the rigidly joined arm members. Furthermore, reducing the number of joins would tend to provide a more robust assembly, this being especially important for assemblies for use with vehicles (which are subject to constant vibrations during use).

In some embodiments, the arm members may be substantially identical, which may help to simplify installation and construction of the assembly.

In some embodiments, the interlocking profiles of the sleeves may be a substantially triangle, sawtooth, sinusoidal or square profile. In such embodiments, the triangle, sawtooth or square profiles may have rounded edges to facilitate engagement therebetween.

In some embodiments, the tightener may be configured for snug receipt through the sleeves, which may help to more closely position the interlocking profiles of the aligned sleeves as they are drawn together.

In some embodiments, the tightener may be tightened by screwing action. In some embodiments, the tightener may, for example, comprise a nut and bolt, where the threaded shank of the bolt passes through the sleeves.

In some embodiments, the assembly may further comprise a side view mirror configured for attachment to the arm members. In some embodiments, the assembly may further comprise a vehicle mounting base configured to receive a portion of the assembly therein. In some embodiments, the assembly may further comprise a motor operable to rotate the arm members with respect to the vehicle mounting base. The motor may, for example, be configured to rotate the joining member within the vehicle mounting base (and hence rotate the side view mirror with respect to the vehicle once installed).

In a second aspect, the present invention provides a power fold side mirror for a vehicle, which comprises the assembly of the first aspect of the present invention.

In a third aspect, the present invention provides a foldable side mirror for a vehicle, which comprises the assembly of the first aspect of the present invention.

In a fourth aspect, the present invention provides a kit of parts for forming the assembly of the first aspect of the present invention, the power fold side mirror of the second aspect of the present invention or the foldable side mirror of the third aspect of the present invention.

In a fifth aspect, the present invention provides a spare part for use with the assembly of the first aspect of the present invention, with the power fold side mirror of the second aspect of the present invention or with the foldable side mirror of the third aspect of the present invention.

In a sixth aspect, the present invention provides the use of the assembly of the first aspect of the present invention, the power fold side mirror of the second aspect of the present invention or the foldable side mirror of the third aspect of the present invention.

In a seventh aspect, the present invention provides a method for fitting a power fold side mirror to a vehicle, the method comprising locating the sleeves of the assembly of the first aspect of the present invention in alignment at a mirror base attached to the vehicle (e.g. at a side of the vehicle, such as on the vehicle's front doors): joining the arms of the assembly by passing the tightener through the aligned sleeves and tightening the tightener. A side view mirror and any attendant housing can subsequently be attached to the arm members.

Additional features and advantages of the various aspects of the present invention will be described below in the context of specific embodiments. It is to be appreciated, however, that such additional features may have a more general applicability in the present invention than that described in the context of these specific embodiments.

BRIEF DESCRIPTION OF DRAWINGS

Embodiments of the present invention will be described in further detail below with reference to the following drawings, in which.

DESCRIPTION OF EMBODIMENTS

Figure 1:
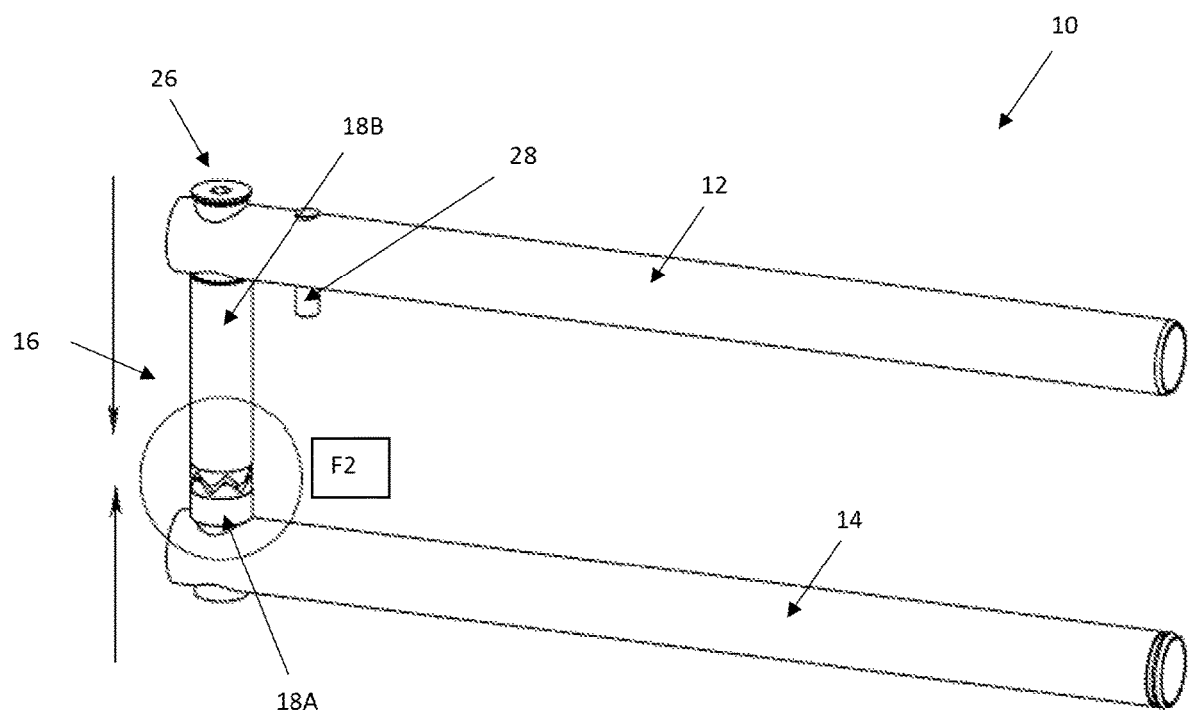
FIG. 1 shows a perspective view of an assembly in accordance with an embodiment of the present invention in an assembled (but untightened) configuration.

As noted above, the present invention provides an assembly for a vehicle's side view mirror. The assembly comprises two arm members which are configured to receive a side view mirror thereat and a joining member for joining the arm members. The joining member comprises two sleeves, where each sleeve projects from a respective arm member and comprises an interlocking profile at a distal end thereof. The assembly also comprises a tightener configured for receipt through the sleeves when the sleeves are in an aligned configuration. Tightening the tightener draws the interlocking profiles of the aligned sleeves into engagement, whereby the arm members become rigidly joined.

The assembly of the present invention has been developed primarily for use with side view mirrors for vehicles (and particularly side view towing mirrors which, as noted above, have to project further out from the side of a vehicle than conventional mirrors in order for the driver to be able to see what is behind the caravan (etc.) being towed by the vehicle), and will be described in further detail in this context below. It is to be appreciated, however, that rigidly joined arm members may have applications in addition to this, and that the invention is therefore not to be construed as being limited to only use with side view mirrors.

Any suitable materials can be used to form the components of the assembly of the present invention. Typically, as the assembly is likely to be subject to constant vibrations and repeated use, the components (and especially the arm members, joining member and tightener) will be formed from durable metallic materials such as stainless steel or mild steel. However, to save weight and to provide other advantages, some components (e.g. as described below) could be made from suitable plastic materials or lighter metallic materials.

The assembly of the present invention includes two arm members which are configured to receive a side view mirror. The arm members may take any suitable form and may be the same or different. The arm members may have any length and diameter (or other non-circular cross sectional dimension) appropriate for the application in which the assembly is to be used. The arm members may be solid or hollow and have any suitable (e.g. circular or square) cross-sectional profile.

The arm members are typically intended to bridge two items (e.g. join two items together), such as a vehicle mounting and a side view mirror. Each arm member (e.g. an end of each arm member) is therefore configured to receive an item (e.g. a side view mirror) thereat. The arms may, for example, be provided with means for physically joining such item(s) to the arms (e.g. holes for receipt of screws, inbuilt fasteners or grooves for circlip retainers), or means for frictionally holding the item thereon (e.g. a textured surface upon which a clamp may be clamped onto).

The arm members may, once joined (as described below), have any alignment with respect to each other. The arms may, for example, be substantially parallel to one another, or may diverge or converge. The alignment of the arm members may, for example, be affected by the angle at which the sleeves project from their respective arms or the interlocking profiles of the sleeves.

In embodiments where the assembly is for use with side view towing mirrors, for example, the arms would typically be substantially identical in length (being about 40 cm long would place the mirror far enough away from the vehicle to be able to see past a caravan being towed, for example) and would be configured for receipt of a side view mirror at the end distal to the sleeves on the joining member.

As noted above, embodiments where the arm members are substantially identical may be advantageous due to there being a fewer number of components requiring manufacture and installation.

The assembly may also include more than two arm members, in embodiments where this might be advantageous (e.g. a particularly large and/or heavy item may require 3 or more arms in order to be adequately supported).

The assembly of the present invention also includes a joining member comprising two sleeves, each of which projects from a respective arm member and comprises an interlocking profile at their distal ends. The sleeves are also configured such that the tightener can be received therethrough (when appropriately aligned). The joining member and sleeves may have any form that can achieve these functions.

The sleeves may, for example, be provided in the form of hollow rods, having an internal diameter that is substantially the same as that of the external diameter of the tightener in order for the tightener to be snugly received inside of the (aligned) sleeves. Such a snug fit would not only help to align the sleeves' interlocking profiles in use, but would also tend to help stabilise the arm members during assembly (e.g. wobbling of, potentially quite long, arm members might unnecessarily complicate a delicate installation process). Typically, the sleeves would be exactly the same size (i.e. in length and in cross-section), although one of the sleeves may be slightly larger or smaller than the other, if this were to provide any advantage (whilst not affecting their interlockability).

The sleeves of the joining member may be provided integrally formed with the respective arm members, or the arm members may comprise means via which the sleeves can be securely joined to their respective arm members (keeping in mind the overarching requirement for rigidity of the arms). If not integrally formed with the respective arm members, the sleeves may, for example, be welded to the arm members or mechanically fastened to the arm members (i.e. in a manner whereby there can be no relative movement therebetween).

Each sleeve may be located on its respective arm member at any suitable position, depending on the intended application of the assembly. Each sleeve may, for example, be located proximal to an end of its respective arm member, so that the joining member is located at or close to one of the ends of the rigidly joined arm members (i.e. the assembly is substantially U-shaped). Such a configuration would be useful, for example, in the foldable towing mirrors described herein, where the joining member defines a pivot point inside of the mirror base for folding the mirror.

The sleeves of the joining member have interlocking profiles at their ends distal to the arm members. The interlocking profiles of the sleeves interlock when the sleeves are drawn together (as will be described below), which results in what is effectively a one piece assembly. As noted above, when so-joined, twisting of the arms with respect to each other is simply not possible, and an assembly having significant advantages over the existing assemblies described above is provided. The interlocking profiles of the sleeves can also assist in ensuring that the arm members are drawn together whilst in the correct alignment, which may help during the latter stages of a side view mirror installation process, for example (e.g. misaligned arms would need to be manually re-aligned before a side view mirror could be fitted thereto).

The interlocking profiles at the ends of the sleeves may take any complementary interlocking form which, when drawn together, provides the necessary rigidity. The interlocking profiles of the sleeves may, for example, be a substantially triangle, sawtooth, sinusoidal or square profile. Triangular or sinusoidal profiles may be preferred due to them having wider mouths and hence their peaks and troughs tending to guide the sleeves (and hence the arms) into alignment more easily than would be the case for a square profile, for example. The triangle, sawtooth or square profiles may have rounded edges, which may also help to facilitate such an engagement therebetween.

The assembly of the present invention also includes a tightener that is configured for receipt through the sleeves (when in an aligned configuration). Tightening the tightener draws the interlocking profiles of the aligned sleeves into engagement such that the arm members become rigidly joined. Any tightener that is capable of achieving this functionality may be used in the assembly of the present invention.

The tightener may have any shape and size suitable for use in the given application. The tightener may also have any form and number of components consistent with its intended application. The tightener may, for example, include a single member that passes through the aligned sleeves and is tightenable at one end thereof. Alternatively, the tightener may comprise two members which, when slid into their respective sleeves, meet at an intermediate point, with the tightener then being tightened from one or both ends. Typically, the tightener would be configured for snug receipt through the sleeves, although this need not always be the case (provided that, once the sleeves have been drawn together, the joining member is rigid).

In some embodiments, for example, the tightener may comprise or be defined by a nut and bolt, where the shank of the bolt is configured such that it, but not the bolt's head, can be passed through the aligned sleeves and a nut (also configured to not fit into the sleeve) placed onto exposed threads at the other side. Tightening of the nut and/or bolt would then draw the sleeves (etc.) together. In some embodiments, recesses may be provided in the assembly (e.g. on the outside portions of the arm members) in which the head of the bolt and nut can be received in order to improve the aesthetics of the assembly or reduce the likelihood of exposed edges of the nut and bolt (or the tightener more generally) catching on something.

The tightener may be tightened using any suitable mechanism. Typically, a screwing action would be used to tighten the tightener, this being a simple yet effective mechanism for achieving a tightening effect. The tightener may be screwed tighter (or untightened) using a spanner, Allen key, screwdriver or other common tool. Alternatively, it may be desirable to use a proprietary tightening mechanism or a one way tightening mechanism in order to prevent unauthorised untightening (e.g. by a thief).

The assembly of the present invention may also include further components, some of which will be described below. As would be appreciated, components in addition to those described below may be needed in some applications. It is, however, within the ability of a person skilled in the art in light of the teachings contained herein to determine whether such additional components are required and, if so, whether any adaptations would be required for them to be used with the assembly of the present invention.

For example, the assembly may also include a side view mirror configured to be attached to the arm members.

For example, the assembly may also include a vehicle mounting base configured to receive a portion of the assembly (e.g. the joining member) therein. Such mounting bases would share a number of common components, but would need to be adapted (e.g. its shape, the nature of the electrical wiring required, etc.) for use with specific vehicles.

The assembly may also include a motor operable to rotate the arm members with respect to the vehicle mounting base (and hence the vehicle). Such a motor would enable the power folding function described above, which is a highly desirable feature for side view mirrors and especially when the side view mirrors are towing mirrors which, of necessity, must project further outwardly from the vehicle than typical side view mirrors (i.e. in order for a driver to be able to see around a caravan (etc.) which they are towing). In such embodiments, the motor is typically configured to rotate the joining member within the vehicle mounting base.

A specific embodiment of the present invention will be described below with reference to the accompanying Figures.

Figure 2:
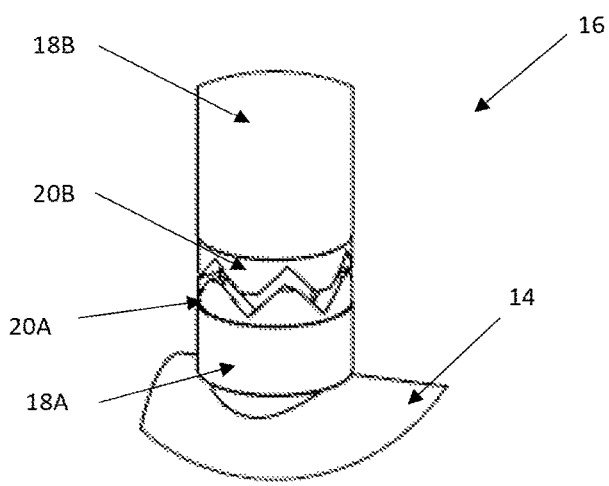
FIG. 2 shows an expanded view of the interlocking profiles of the aligned sleeves of the assembly of FIG. 1.
Figure 3:
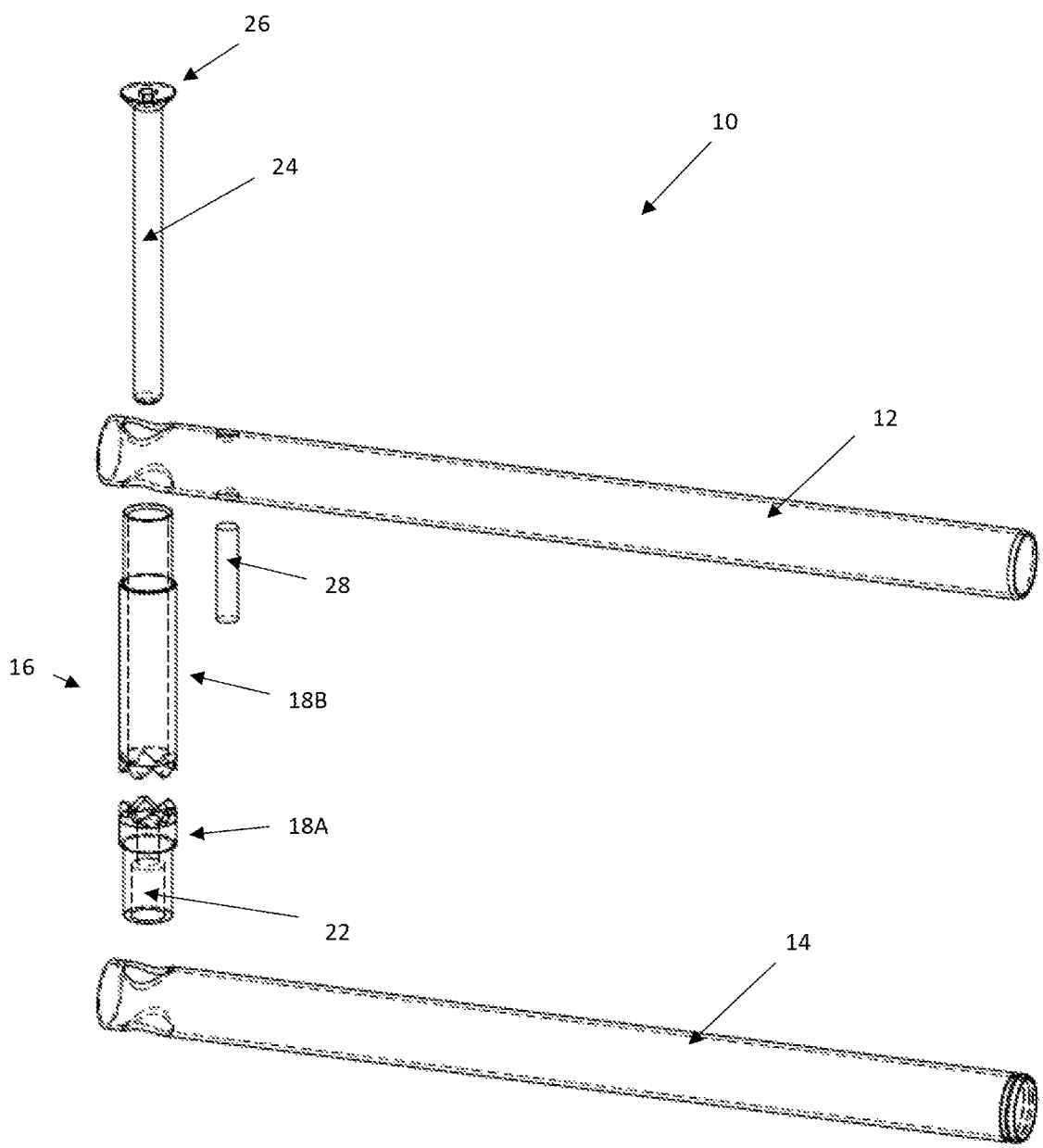
FIG. 3 shows an exploded view of the assembly of FIG. 1.
Figure 4:
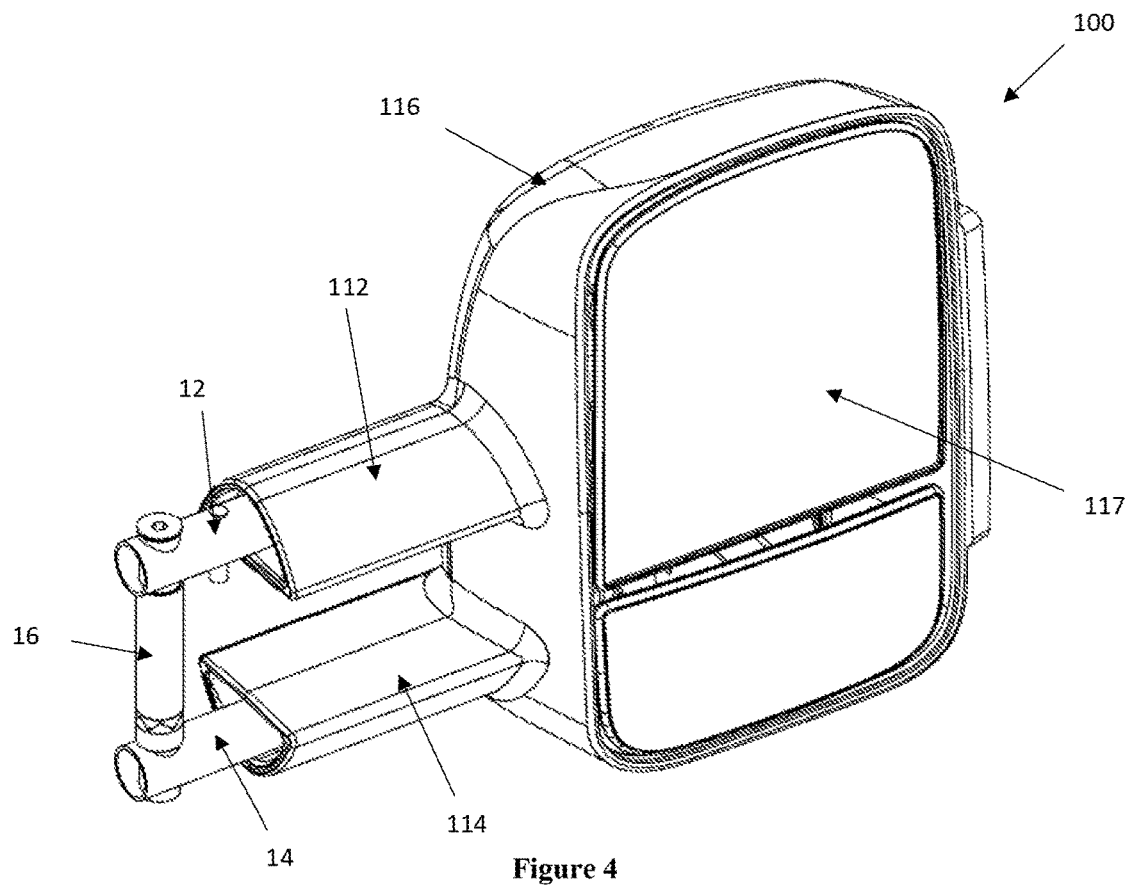
FIG. 4 shows a perspective view of the assembly of FIG. 1 having a side view mirror attached thereto.

Referring firstly to FIGS. 1 to 3, an assembly is shown in the form of arm assembly 10. Arm assembly 10 has upper 12 and lower 14 arms, which are joined by a joining member in the form of rod 16. Rod 16 is formed when two sleeves 18A and 18B are joined together in the manner described below. Sleeves 18A and 18B are provided integrally formed with arms 14 and 12, respectively. The sleeves 18A and 18B may, for example, be welded onto their respective arms (as is the case in the present embodiment), or the arm may be cast with its sleeve integrally formed thereon. The sleeves may otherwise be mechanically fastened to their respective arms, in a manner consistent with the overarching requirement that arms 12, 14 be rigidly joined. As can be seen, the rod 16 is located at one end of the arms 12, 14, with the other end of the arms being configured to receive a side view mirror, as will be described below.

Referring now to FIG. 2, sleeves 18A and 18B are shown in greater detail. The ends of sleeves 18A and 18B have interlocking profiles in the form of teeth profiles 20A and 20B, respectively. When drawn together (i.e. in the direction of the arrows shown in FIG. 1), the teeth profiles 20A and 20B are brought to bear on one another, with the peaks of teeth profiles 20A being guided into the troughs of teeth profiles 20B (and vice versa) because of their triangular shape. As would be appreciated, once the peaks of teeth profiles 20A are at the troughs of teeth profiles 20B (and vice versa), there is practically no scope for relative movement of the sleeves 18A and 18B, and especially a twisting movement that might enable a degree of play to occur between so-joined arms 12 and 14, which, as noted above, is a significant problem with existing arm assemblies for side view mirrors.

Referring to FIG. 3, a tightener is provided in the form of a thread 22 located inside of sleeve 18A and a bolt 24, which is sized to fit snugly inside of rod 16 with the top of the bolt 24 being shown in the form of bolt head 26 (see also FIG. 1). Bolt head 26 is, in this embodiment, provided with a hexagonally shaped hole therein, for receipt of an appropriately sized Allen key in order to effect tightening. Internal thread 22 may be provided integral with either sleeve 18A (as shown in FIG. 3) or with arm 14 (e.g. by welding). In use, the shank of the bolt 24 is passed through aligned (i.e. as shown in FIGS. 1 to 3) sleeves 18A and 18B until its end reaches internal thread 22. Once in this position, a screwing action effected on the head 26 of the bolt 24 causes its thread to engage with internal thread 22 in the conventional manner, and hence draw the head 26 towards the internal thread 22. This movement also draws arms 12, 14, sleeves 18A and 18B and teeth profiles 20A and 20B towards one another, whereupon they interlock in the manner described above.

The upper arm 12 of the assembly 10 also has a stop pin 28, which prevents the arms 12, 14 from over rotating when folding and unfolding the side view mirror in use (as described below).

Referring now to FIGS. 4 to 7, shown is a power fold side view mirror assembly 100 which incorporates arm assembly 10. Mirror assembly 100 includes mirror arms 112 and 114 and mirror body 116. As can be seen in cross section in FIG. 6, the inside of mirror arms 112 and 114 are shaped to receive thereat the arms 12 and 14, respectively. In use, the mirror assembly 100 is securely attached to the arms 12 and 14 and, as arms 12 and 14 are held in rigid alignment with one another, there is no play between the arms 12 and 14, as commonly occurs in the arms of existing side view mirrors (e.g. those described above). As a result, mirror assembly 100 experiences much less vibration in use than is the case for existing mirror assemblies.

Although not shown, mirror body 116 would usually also include the components for attaching the mirrors 117 to the body 116, as well as actuators operable by a user from inside the vehicle to adjust the tilt of the mirrors 117, as is common in side view mirrors. The body 116 may also include motors (not shown) operable to slide the mirror body 116 along the arms 12 and 14, if such functionality might be desirable to a user (e.g. so that the user is able to control the distance from the vehicle the side view mirrors 117 project, for example in order to see around a caravan being towed by the vehicle).

The mirror assembly 100 and arm assembly 10 are shown in FIGS. 4 to 7 incorporated into the other components of a power fold side mirror. Such other components include a mirror base 118 that has a vehicle attachment portion 120 and a motor housing body 122. Vehicle attachment 120 is shaped and configured for attachment to a vehicle (not shown), typically on or adjacent to the front side windows of the vehicle, as is the case for conventional side mirrors. The vehicle attachment 120 would usually be unique to each vehicle, especially with respect to its physical form, in order to be physically and electrically connectable to the vehicle. It is envisaged that different vehicle attachments would be provided in order for the power fold side mirror to be compatible with (and retrofitable to) any given vehicle (which can sometimes vary with model and year). The remainder of the power fold side mirror would, however, likely be common, regardless of vehicle type. The electrical wiring required in order to connect the mirror 100 to the vehicle may also vary for similar reasons.

Figure 6:
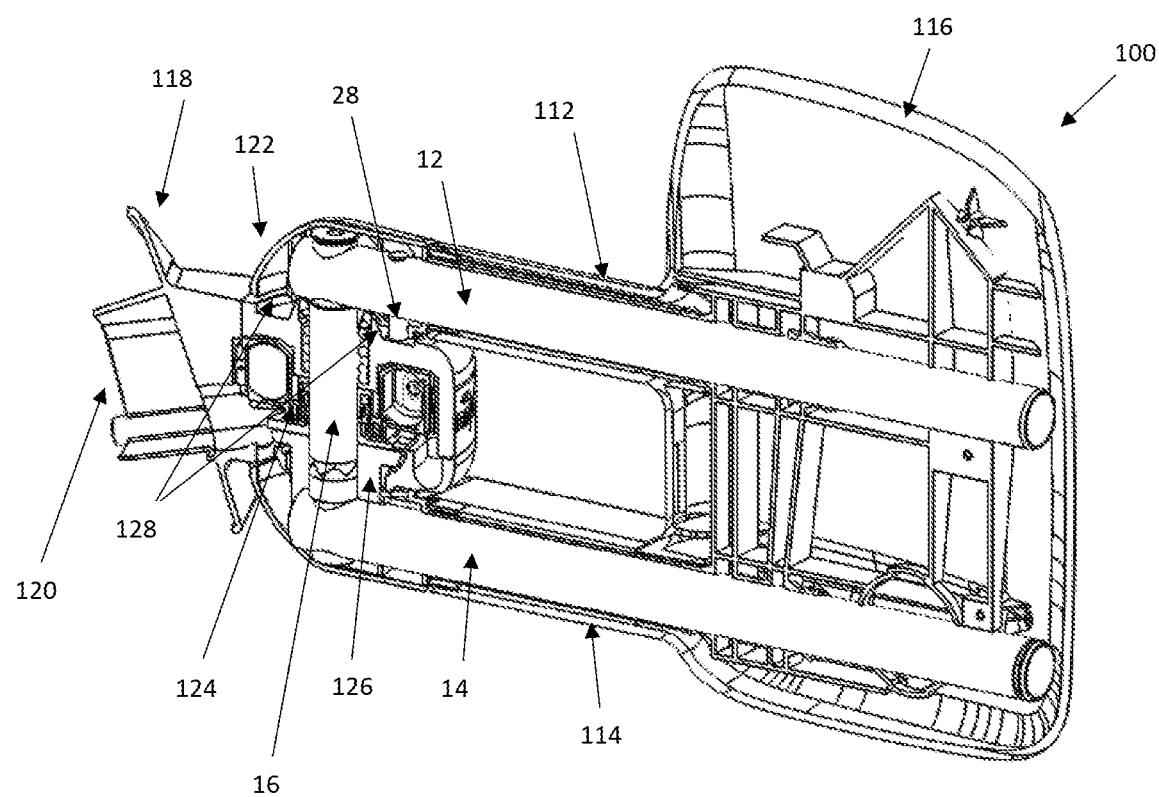
FIG. 6 shows a perspective cutaway view of the power fold side view mirror assembly of FIG. 5.

As can be seen in FIG. 6, power fold side mirror assembly 100 also includes a motor housing body 122 which houses a motor module 124 and a cradle 126 (only half of which can be seen), which receives the rod 16 thereat and which is rotatable such that the arm assembly 10 (and other components attached to the assembly 10) can be rotated with respect to the motor housing body 122. Hence, the mirror body 116 can be folded closer to and further away from the side of the vehicle, as will be described below.

The motor module 124 is operable to physically rotate the cradle 126 and hence the rod 16, whereby the arms 12, 14 rotate about a central axis of the rod 16 in order to automate the folding movement. The module 124 may, for example, be operated in such a manner by a user pressing a button inside the vehicle before the vehicle is driven into a tight space (e.g. the user's garage) or left in a car park. The stop pin 28 resides within an annular recess 128, through which it can move until such time as it abuts a restrictor pin (not shown) within the recess 128. In use, a first restrictor pin (e.g. a small bolt screwed into an aperture in the recess 128) would typically be positioned within the recess 128 to block the assembly 100 from being folded too close to the side door of the vehicle (where the door or mirror 117 might be damaged), and a second restrictor pin positioned within the recess 128 to block the assembly 100 from being unfolded too far, where it might strike the front of the vehicle.

Figure 5:
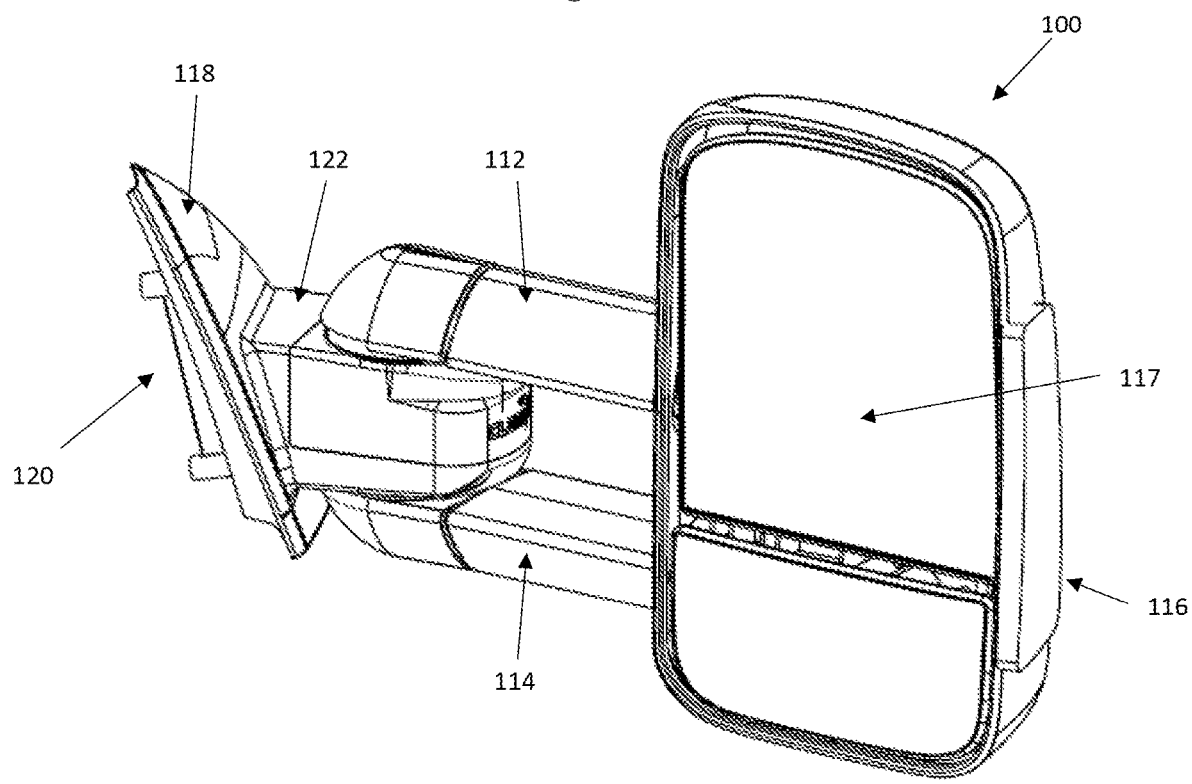
FIG. 5 shows a perspective view of the assembly of FIG. 1 as part of a power fold side view mirror assembly in an operational configuration.
Figure 7:
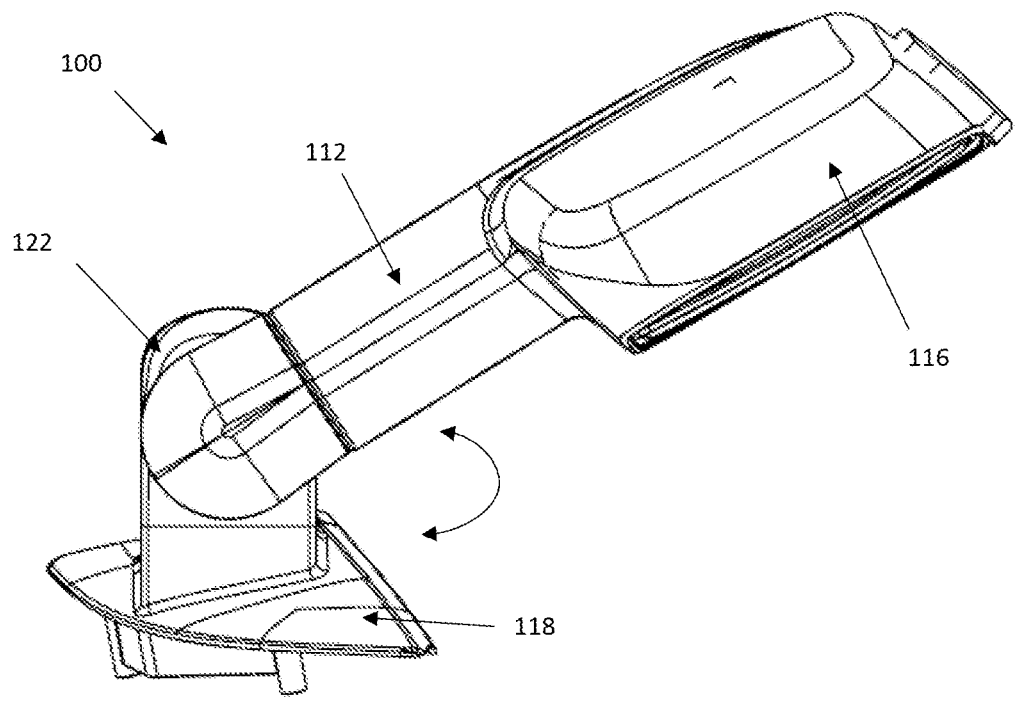
FIG. 7 shows the power fold side view mirror assembly of FIG. 5, folded into a stowed configuration.

As can be seen by comparing FIGS. 5 and 7, the mirror assembly 100 is moveable between two configurations (e.g. via power folding). The first ("driving") configuration is shown in FIG. 5, where the mirror body 116 is positioned with respect to the vehicle attachment portion 120 (and hence the vehicle, in use) in a position where the driver of the vehicle will be able to see behind the vehicle (and behind the vehicle being towed, if relevant). Actuation of the motor 124 causes the assembly 10 (not visible in FIGS. 5 and 7) to rotate about the rod 16/cradle 126 and hence the mirror body 116 (etc.) to rotate inwardly (e.g. towards the driver's side door), whereupon it is in a less obtrusive position.

In some embodiments, the mirror body 116 may be able to be manually pushed between these configurations (and possibly an even more unfolded position). In such embodiments, the stop pin 28 will limit the range of movement of the mirror body 116 with respect to the vehicle attachment portion 120, as described above.

It will be appreciated that the present invention provides a number of new and useful advantages. For example, specific embodiments of the present invention may provide one or more of the following advantages:

- a side view towing mirror can be rigidly held with a minimum amount of vibration or other play between the supporting arm members, reducing vibration of the side view mirror (especially for towing side view mirrors) in use, which can help to improve the mirror's effectiveness and lifespan;
- the arms of the assembly can be drawn into an exact alignment by the interlocking profiles, making installation of the side view mirrors more straightforward; and
- the arms can be held together even when the sleeves have not been tightly drawn together, which may help to simplify the installation process of a rear view towing mirror on a vehicle.

It will be understood to persons skilled in the art of the invention that many modifications may be made without departing from the spirit and scope of the invention. All such modifications are intended to fall within the scope of the following claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An assembly for a side view mirror for a vehicle, the assembly comprising:
    two arm members, the arm members being configured to receive a side view mirror thereat;
    a joining member for joining the arm members, the joining member comprising two sleeves, each sleeve projecting from a respective arm member and comprising an interlocking profile at a distal end thereof, wherein each sleeve is integrally formed with the respective arm member; and
    a tightener configured for receipt through the sleeves when the sleeves are in an aligned configuration,
    wherein tightening the tightener draws the interlocking profiles of the aligned sleeves into engagement, whereby the arm members become rigidly joined.

2. The assembly of claim 1, wherein each sleeve is positioned proximal to an end of the respective arm member.

3. The assembly of claim 1, wherein the arm members are substantially identical.

4. The assembly of claim 1, wherein the arm members are, when rigidly joined, in a substantially parallel alignment.

5. The assembly of claim 1, wherein the interlocking profiles of the sleeves comprise a substantially triangle, sawtooth, sinusoidal or square profile.

6. The assembly of claim 5, wherein the triangle, sawtooth or square profiles have rounded edges to facilitate engagement therebetween.

7. The assembly of claim 1, wherein the tightener is configured for snug receipt through the sleeves.

8. The assembly of claim 1, wherein the tightener is tightened by a screwing action.

9. The assembly of claim 1, wherein the tightener comprises a nut and bolt.

10. The assembly of claim 1, further comprising a side view mirror configured for attachment to the arm members.

11. The assembly of claim 1, further comprising a vehicle mounting base configured to receive a portion of the assembly therein.

12. The assembly of claim 11, further comprising a motor operable to rotate the arm members with respect to the vehicle mounting base.

13. The assembly of claim 12, wherein the motor is configured to rotate the joining member within the vehicle mounting base.

14. A power fold side mirror for a vehicle, comprising the assembly of claim 1.

15. A foldable side mirror for a vehicle, comprising the assembly of claim 1.

* * * * *